No. 664,680. Patented Dec. 25, 1900.
J. RUMP.
SEED CLEANING AND SEPARATING MACHINE.
(Application filed Aug. 22, 1898.)
(No Model.) 4 Sheets—Sheet 2.
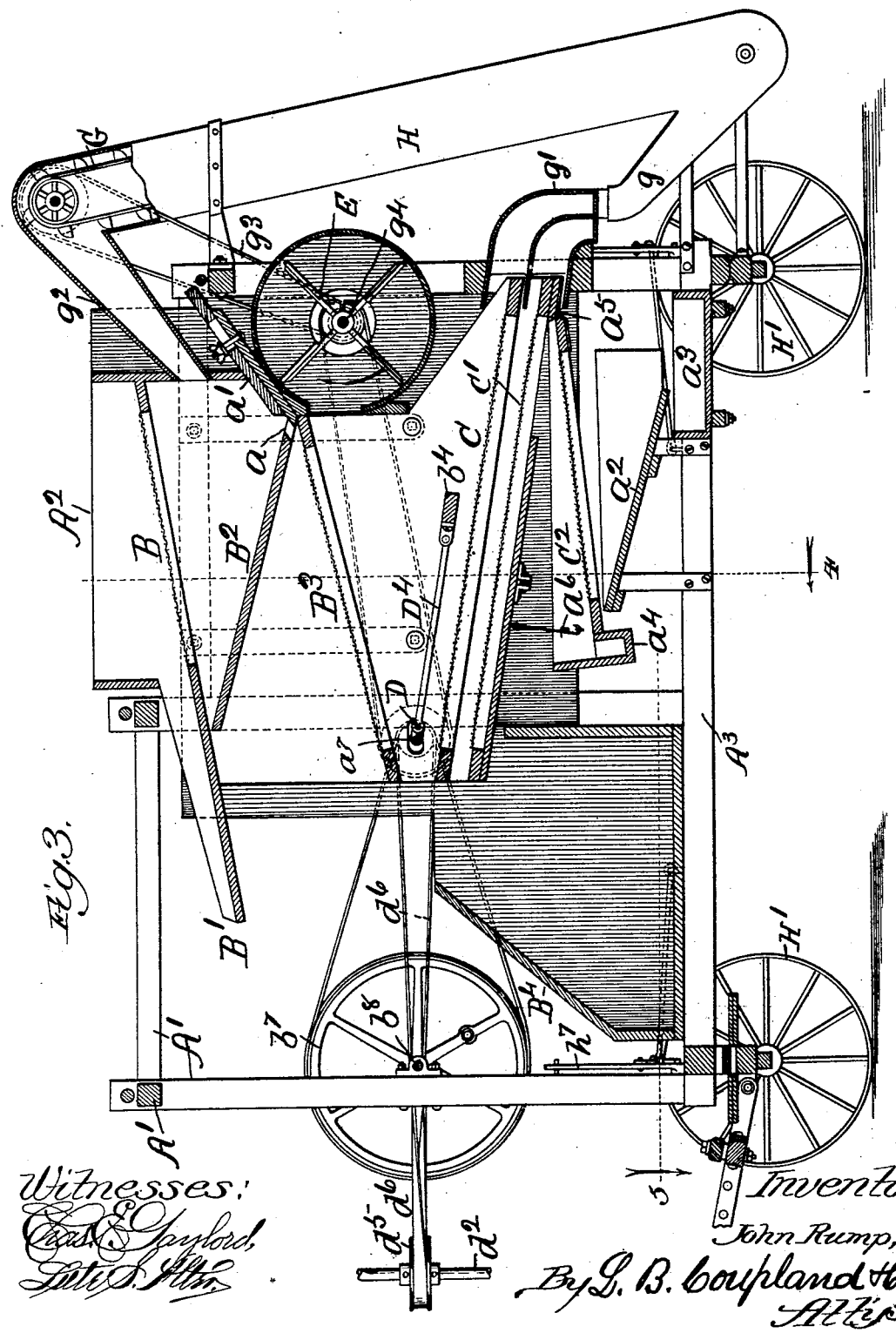
Witnesses: Inventor,
John Rump,
By L. B. Coupland & Co
Attys No. 664,680. Patented Dec. 25, 1900.
J. RUMP.
SEED CLEANING AND SEPARATING MACHINE.
(Application filed Aug. 22, 1898.)
(No Model.) 4 Sheets—Sheet 3.

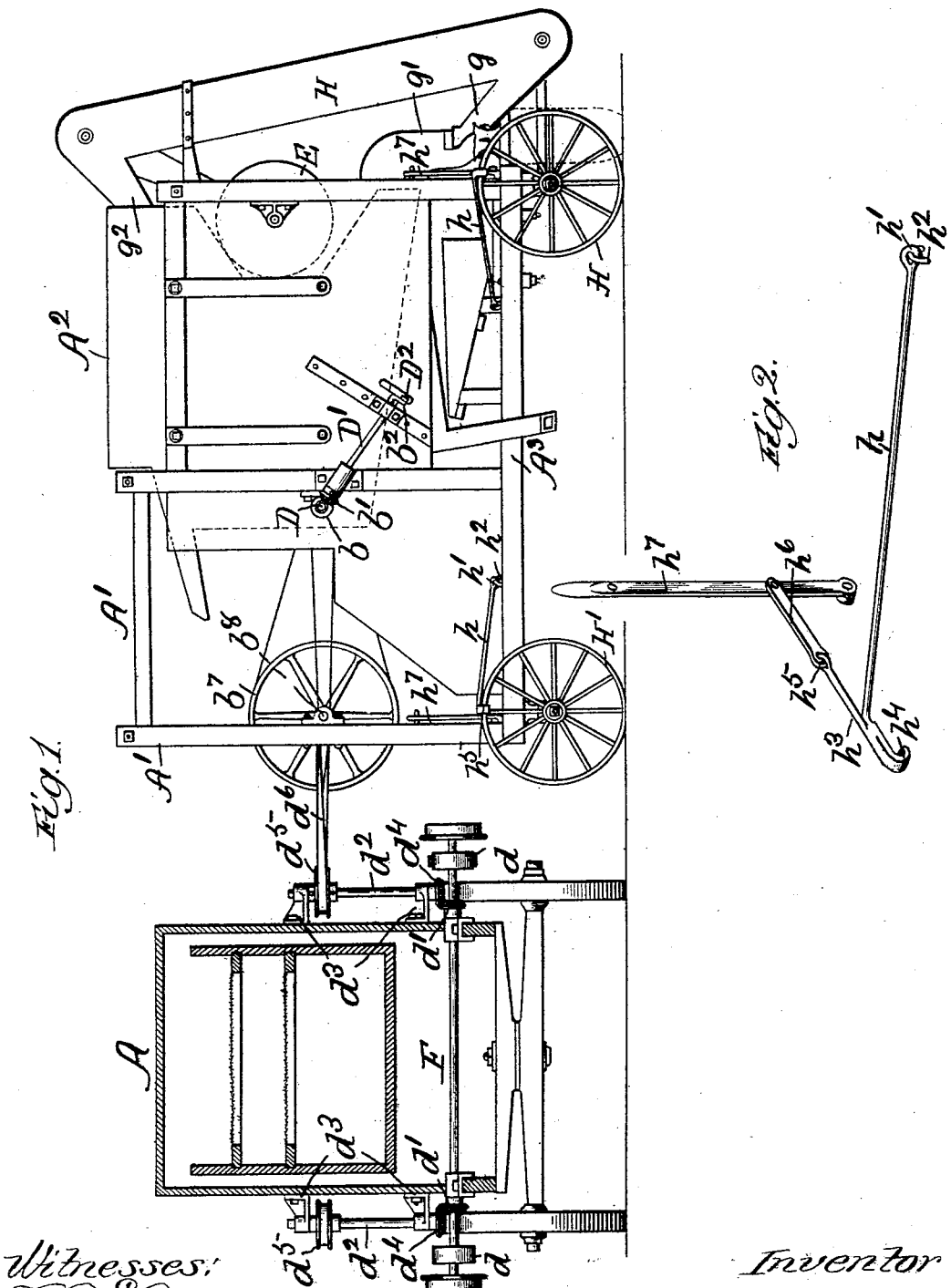

Witnesses:

Inventor:
John Rump,
By L. B. Coupland & Co
Attys.

No. 664,680. Patented Dec. 25, 1900.
J. RUMP.
SEED CLEANING AND SEPARATING MACHINE.
(Application filed Aug. 22, 1898.)
(No Model.) 4 Sheets—Sheet 4.

Witnesses:

Inventor:
John Rump,
By L. B. Coupland & Co.
Att'ys

UNITED STATES PATENT OFFICE.

JOHN RUMP, OF WEST POINT, IOWA.

SEED CLEANING AND SEPARATING MACHINE.

SPECIFICATION forming part of Letters Patent No. 664,680, dated December 25, 1900.

Application filed August 22, 1898. Serial No. 689,191. (No model.)

*To all whom it may concern:*

Be it known that I, JOHN RUMP, a citizen of the United States, residing at West Point, in the county of Lee and State of Iowa, have invented certain new and useful Improvements in Seed Cleaning and Separating Machines; and I do hereby declare the following to be a full, clear, and exact description of the invention, such as will enable others skilled in the art to which it appertains to make and use the same.

This invention relates to improvements in that class of machines used in the process of cleaning and recleaning different kinds of seeds, the same consisting of certain novel features in the construction, arrangement, and operation, as will be hereinafter set forth.

One of the objects of this invention is to combine with the ordinary threshing-machine or clover-huller a recleaning-machine embodying the improved features and which may be operated from either side of the thresher, as shall be necessary, considering the direction of the wind.

Figure 4:
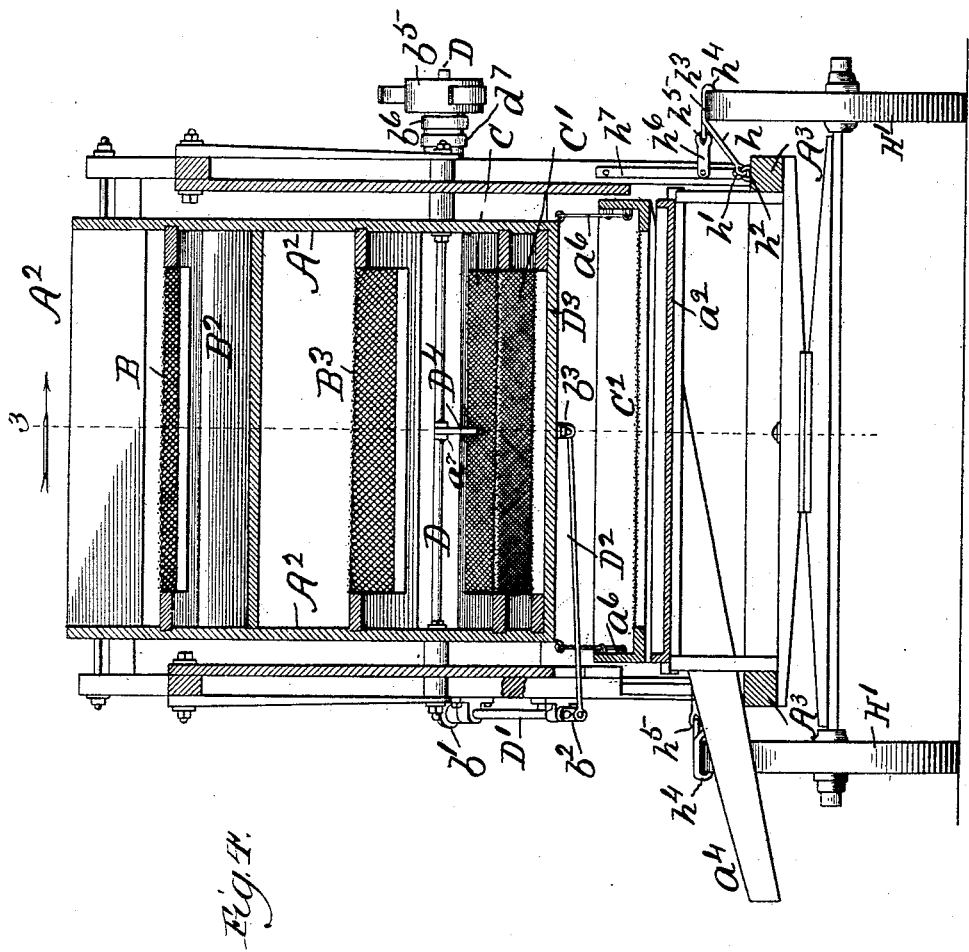
Figure 5:
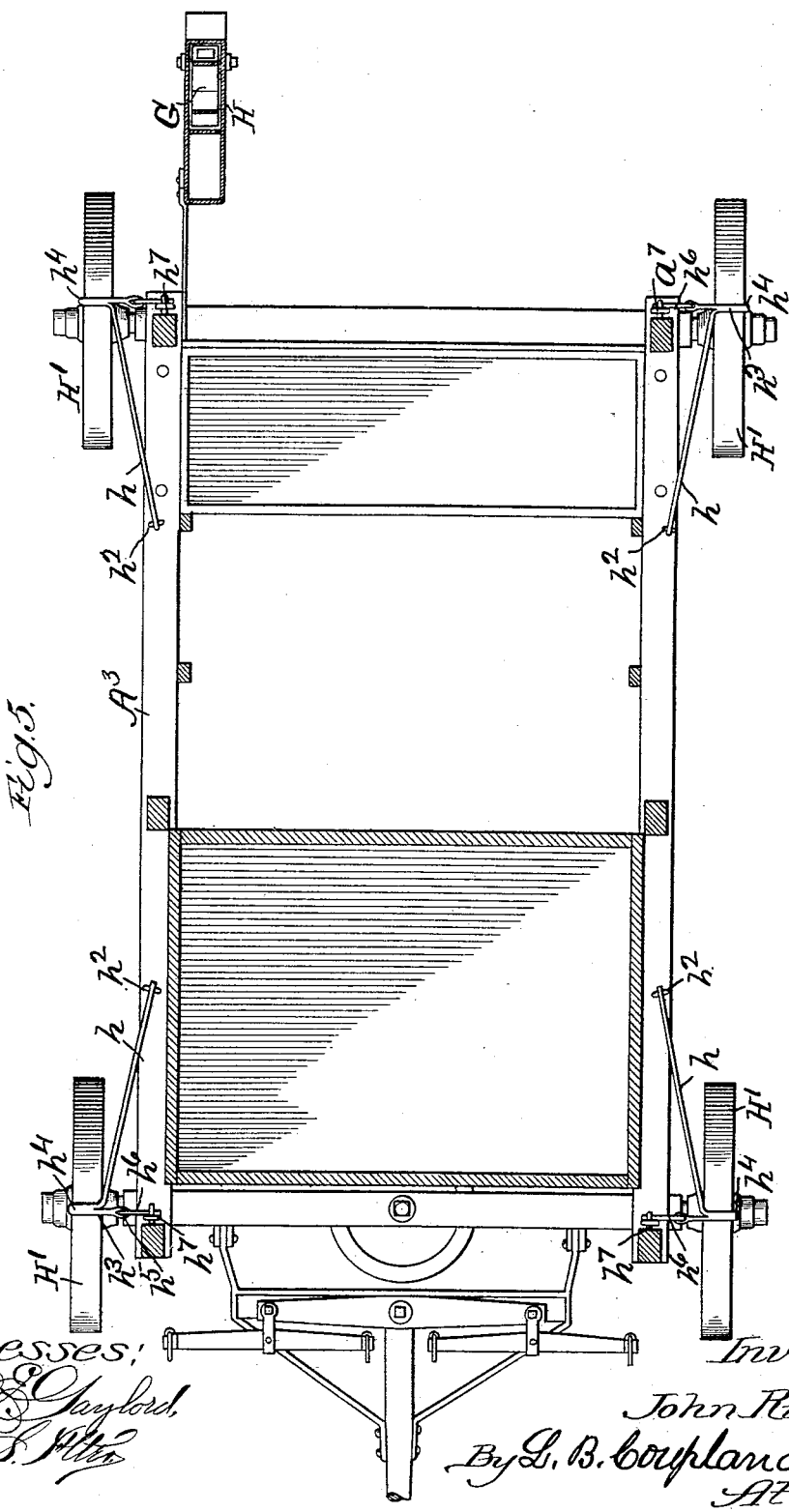

Figure 1 is a combination view showing a vertical transverse section of a threshing-machine or clover-huller and a side elevation of a recleaning-machine; also, illustrating the means for transmitting motion from the former to the latter. Fig. 2 is a detached detail of the device used in locking the wheels of the recleaner. Fig. 3 is a vertical longitudinal section of the recleaner on line 3, Fig. 4, looking in the direction indicated by the arrow. Fig. 4 is a transverse section on line 4, Fig. 3. Fig. 5 is a horizontal section on line 5, Fig. 3.

The seed cleaning and separating machine is mounted on truck-wheels to facilitate the movement of the same in changing location relative to the position of the threshing-machine.

A may represent an ordinary threshing-machine or clover-huller used in the first preparatory steps before the matter is run through the recleaner. A detailed description of the thresher will be omitted, except as to the means employed for transmitting motion from either side of the same to the recleaner and separator.

A' represents the different parts of the main frame of the recleaning-machine mounted on an independent truck $A^3$. There are a number of separations for the different kinds of grain and seed, such as rye, redtop, clover, timothy, and weed seeds. The riddles or screens are of a different mesh for the various grains and seeds and are supported in a suitable frame $A^2$, adapted to have both a lateral and an endwise shaking action. The matter to be separated and cleaned is first deposited on the upper screen B. The grain and other matter too large to pass through are carried off by the spout or shoe B'. The matter passing through drops into the shaking-hopper $B^2$, from which it gradually passes through an opening $a$, Fig. 3, onto the second screen $B^3$, which separates and carries away the weed-seeds and deposits the same in the receptacle $B^4$. The flow through the opening $a$ is regulated by means of an adjustable slide $a'$, by means of which the area of the opening may be increased or diminished, as circumstances may require. The seed passing through the second screen $B^3$ drops onto the third screen C, on which the clover-seed is separated from the timothy and redtop, the clover running off being spouted into a sack or other suitable receptacle, the timothy and redtop dropping through onto the fourth screen C', from which the timothy-seed is carried off and separated from the redtop, the latter dropping onto and through the last screen $C^2$ and is deposited on the inclined board $a^2$ and passes into the box-receptacle $a^3$, the tailings and floating refuse being carried away by the spout $a^4$. The last screen $C^2$ has a hinge connection $a^5$ at its outer highest end, the inner end being suspended from the bottom of the shaking-frame by an adjustable hook-support $a^6$, Fig. 3, so that the degree of inclination may be increased or diminished as the kind of work being done may require.

The rotatable driving-shaft D passes through from side to side and is provided with suitable journal-bearings. A pinion $b$ is mounted on one end of the shaft D and engages with a pinion $b'$, mounted on the upper end of an inclined shaft D', located at one side of the machine, as shown in Figs. 1 and 4. A crank-arm $b^2$ is mounted on the lower end of the shaft D'. The outer end of a rod D² is detachably connected with the crank-arm $b^2$, as shown in Figs. 1 and 4. The inner end of the rod D² is detachably secured to a bracket-lug $b^3$, secured to the under side of the bottom board D³ of the screen-shaking frame, which provides for the lateral or side shake, as more particularly shown in Fig. 4. The driving-shaft D is provided near its longitudinal center with a crank $a^7$. One end of a rod D⁴ has a detachable connection with said crank. The other end of the rod D⁴ is detachably connected to a cross-bar $b^4$, forming a part of the shaking-frame, which provides for the endwise-shaking action of the screening-frame. By this arrangement means is provided for imparting both a lateral and endwise vibratory action of the screen-holding frame simultaneously when such action is necessary. By removing the pins or bolts securing the rods D² and D⁴ in their working position either rod may be disconnected and the dual shaking action limited to one independent movement, either the side or end shake, as may be required.

E represents a fan-wheel, which has a belted driving connection with the pulley $b^5$, mounted on one end of the driving-shaft D. A second pulley $b^6$ is mounted on this end of the shaft and belts with a fly-wheel $b^7$, mounted on a transverse driving-shaft $b^8$, journaled in the frame at the front end of the machine.

A horizontal driving-shaft F is journaled in the frame of the threshing-machine, Fig. 1, and has belt-pulleys $d\ d$ mounted on the respective ends thereof. This shaft is provided near each end with pinions $d'\ d'$. On each side of the threshing-machine and in line with the driving-shaft F are placed vertical companion shafts $d^2\ d^2$, journaled in bearing-brackets $d^3\ d^3$. Companion pinions $d^4\ d^4$ are mounted on the respective lower ends of the vertical shafts $d^2$ and engage with the pinions $d'$. The band-pulleys $d^5\ d^5$ are mounted on the upper ends of the shafts $d^2$, from one of which runs a belt $d^6$, connecting with pulley $d^7$ on the shaking-shaft D, and thereby transmitting the required power and motion. This arrangement provides for the recleaner being set on either side with reference to the thresher and operated by a driving-belt $d^6$ from either of the two pulleys $d^5$. This is a very essential feature, as there are times when the wind suddenly changes, making it necessary to change the position of the recleaner, which can be done in a few minutes. This is an advantage not possessed by machines of this class.

At the rear end of the recleaner and connected therewith is located a belt-elevator G, inclosed in a casing H. The lower or foot end is provided with an upturned receiving-spout $g$, connecting with a discharge-spout $g'$ on the recleaner. When it is necessary to reclean the material, it is taken into and carried up by the elevator and discharged into the hopper B² through the spout $g^2$, which operation may be repeated until the required separation has been effected. When the condition of the material is such that it does not require reworking, the lower receiving end of the elevator may be disconnected and the product spouted into sacks or other receptacles. The necessary motion is transmitted to the elevator by a belt $g^3$, running from the fan-shaft $g^4$, as shown in Fig. 3.

Releasable means for locking each of the wheels H' of the truck of the recleaner when it has been placed in position for use is provided and consists of a rod $h$, Fig. 2, having a loop $h'$ in one end which engages with an eye or staple $h^2$, inserted in the side bars of the said truck. On the opposite end of this rod is formed a bar $h^3$, extending at right angles and having a hook $h^4$ on one end thereof which is adapted to hook over and detachably engage with the rim of the truck-wheels. The opposite end of the bar $h^3$ has a loop engagement, as at $h^5$, with one end of a link $h^6$, the other end of which is pivoted to an operating-lever $h^7$. By moving this lever outwardly the hook end is disengaged from the wheel-rim, so that the machine may be moved. By moving the lever inwardly the hook end is thrown into engagement and the wheel or wheels locked. Each of the four wheels is provided with one of the locking devices. A description of one will answer for all.

Having thus described my invention, what I claim as new, and desire to secure by Letters Patent, is—

1. A recleaner for the grain, as it comes from a threshing-machine, mounted on an independent truck and provided with a driving-shaft and pulley, in combination with a threshing-machine provided at each side with a vertical shaft and pulley, and a transverse shaft geared to and driving each of these shafts; and a belt whereby the driving-shaft of the recleaner may be connected with either of the vertical shafts at will, substantially as set forth.

2. A recleaner for the grain as it comes from a threshing-machine mounted on an independent truck; releasable means for locking the wheels of said truck and converting them into stationary supports during the threshing operation, said recleaner being provided with a driving-shaft and pulley, in combination with a threshing-machine provided at each side with a vertical shaft and pulley and a transverse shaft geared to and driving each of these shafts; and a belt whereby the driving-shaft of the recleaner may be connected with either of the vertical shafts at will, substantially as set forth.

3. The combination of the threshing-machine A, provided at each side with a vertical shaft $d^2$, having suitable connections whereby it is driven, and a pulley $d^5$, of the recleaner A² mounted on an independent truck, and connections for imparting motion to all these parts, a transverse driving-shaft $b^8$ transmitting motion to these connections, and a belt and pulley whereby said shaft is driven at will from either of the vertical shafts on the thresher, substantially as set forth.

In testimony whereof I affix my signature in presence of two witnesses.

JOHN RUMP.

Witnesses:
L. M. FREEMAN,
L. B. COUPLAND.